United States Patent
Wolf

[15] 3,635,140
[45] Jan. 18, 1972

[54] TRIPOD-MOUNTED SCANNING CAMERA

[72] Inventor: Jesse D. Wolf, Golden, Colo.
[73] Assignee: Trans Horizons, Inc., Ontario, Canada
[22] Filed: Sept. 5, 1969
[21] Appl. No.: 855,681

[52] U.S. Cl.................................................95/15, 352/69
[51] Int. Cl.........................................................G03b 37/00
[58] Field of Search..............................95/15, 17, 16; 352/69

[56]  References Cited

UNITED STATES PATENTS

| | | | |
|---|---|---|---|
| 1,977,310 | 10/1934 | Kanolt | 352/69 |
| 512,512 | 1/1894 | Marcellus | 95/15 |
| 1,232,993 | 7/1917 | Tangvary et al. | 95/15 |
| 1,503,437 | 7/1924 | James | 95/15 |
| 3,120,160 | 2/1964 | Hammer | 95/15 |
| 3,240,140 | 3/1966 | Hearon et al. | 95/15 |
| 3,374,721 | 3/1968 | Van Praag | 95/15 |

Primary Examiner—Samuel S. Matthews
Assistant Examiner—Richard M. Sheer
Attorney—Berman, Davidson and Berman

[57] ABSTRACT

A rotary panoramic camera assembly consisting of a support and a camera rotatably mounted thereon and driven in a horizontal plane by a reversible electric motor whose operation is controlled by microswitches at opposite ends of a specified arc of scanning traverse of the camera. The camera has changeable lenses and a changeable film cassette having a film advance mechanism driven through a gear system by the main camera motor. The gear system includes a speed-selecting gear-change assembly to change the speed of film movement in accordance with a change of camera lenses. The camera includes adjustable focusing mechanism, an automatic iris control system, an adjustable aperture, a film footage indicator, and a solenoid-operated idler gear in the gear system which automatically uncouples the film advance mechanism from the system at the end of the forward scan of the camera and during the return movement of the camera to its starting position for repeating the scan.

17 Claims, 7 Drawing Figures

PATENTED JAN 18 1972

INVENTOR.
JESSE DAVID WOLF,
BY
Berman, Davidson & Berman,
ATTORNEYS.

INVENTOR.
JESSE DAVID WOLF,
BY
Berman, Davidson & Berman,
ATTORNEYS.

INVENTOR.
JESSE DAVID WOLF,
BY
Berman, Davidson & Berman,
ATTORNEYS.

TRIPOD-MOUNTED SCANNING CAMERA

This invention relates to camera systems of the panoramic type, and more particularly to a scanning camera which is rotated through an arc of scanning movement and which contains a photosensitive film strip which is advanced concurrently with the scanning movement of the camera.

A main object of the invention is to provide a novel and improved rotary panoramic camera assembly which involves relatively simple components, which is easy to set up for use, which is reliable in operation, and wherein the rate of movement of its film strip can be easily coordinated with the specific lenses employed in the camera.

A further object of the invention is to provide an improved rotary panoramic camera assembly which is relatively compact in size, which can be operated by relatively unskilled personnel, which is durable in construction, and which is easily adjustable to provide optimum photographic results.

A still further object of the invention is to provide an improved rotary panoramic camera adapted to scan a specified angle of traverse, during which its film is automatically moved at the proper rate, in accordance with the speed of scanning movements of the camera and the focal length of the lens selected for use in the camera, the assembly being provided with means to easily change the rate of movement of the film in the event that the lens of the camera is changed, and being provided with means for automatically uncoupling the film drive mechanism so that the film remains stationary after the camera has finished its scanning movements and during the time in which the camera has returned to its starting position for repeating said scanning movements.

A still further object of the invention is to provide an improved rotary panoramic camera assembly which is electrically driven and which is reversible so that after completing a specified scan, the camera thereof can be returned to its starting position for repeating the scan, the assembly including means for driving the film strip of the camera in accordance with and simultaneously with the scanning movement of the camera, and with easily operated speed-changing means to change the speed of movement of the film in accordance with the focal length of the lens selected for use in the camera, the speed-changing mechanism being very simple in construction, being easy to operate, requiring no dismantling of any portion of the camera assembly for actuation thereof, and providing positive control over the relative speed of movement of the film strip with respect to the speed of scanning of the camera.

A still further object of the invention is to provide an improved rotary panoramic camera assembly having the advantages above mentioned and wherein a changeable film cassette is employed which includes the film supply and takeup means required for the proper movement of the film strip employed with the camera and which includes a film footage indicator.

Further objects and advantages of the invention will become apparent from the following description and claims, and from the accompanying drawings, wherein:

Figure 2:
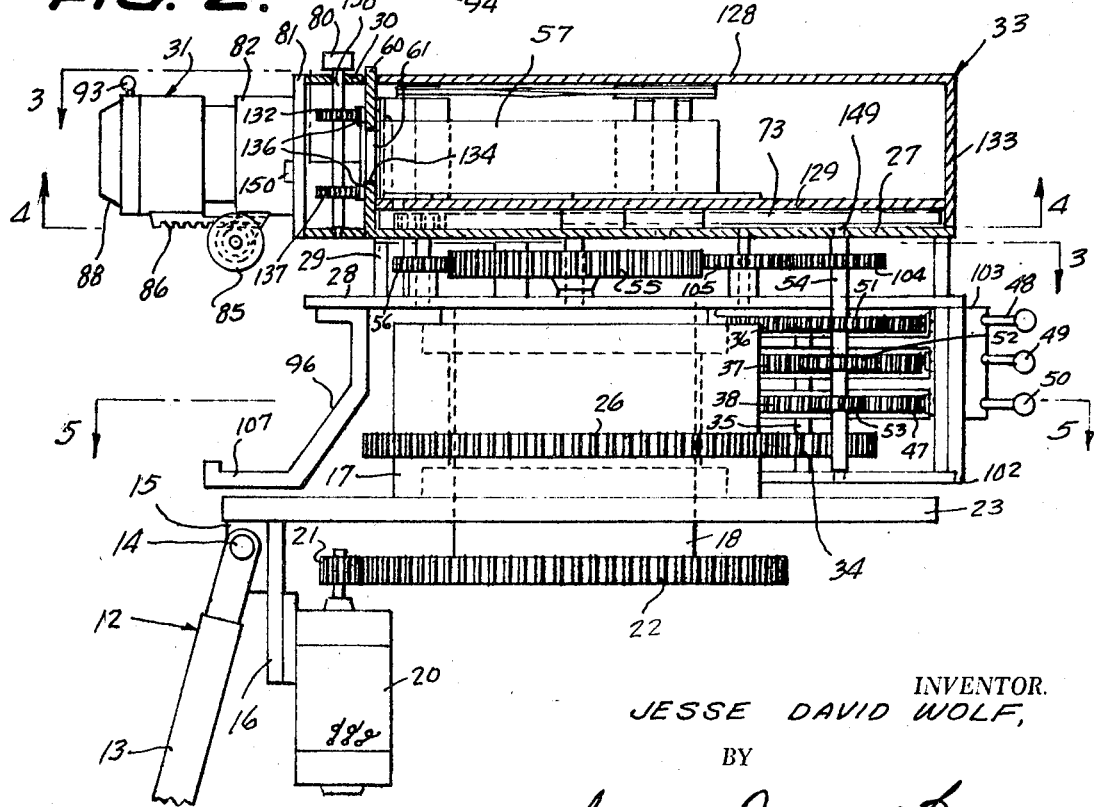
FIG. 2 is a longitudinal vertical cross-sectional view taken substantially on the line 2—2 of FIG. 1.
Figure 6:
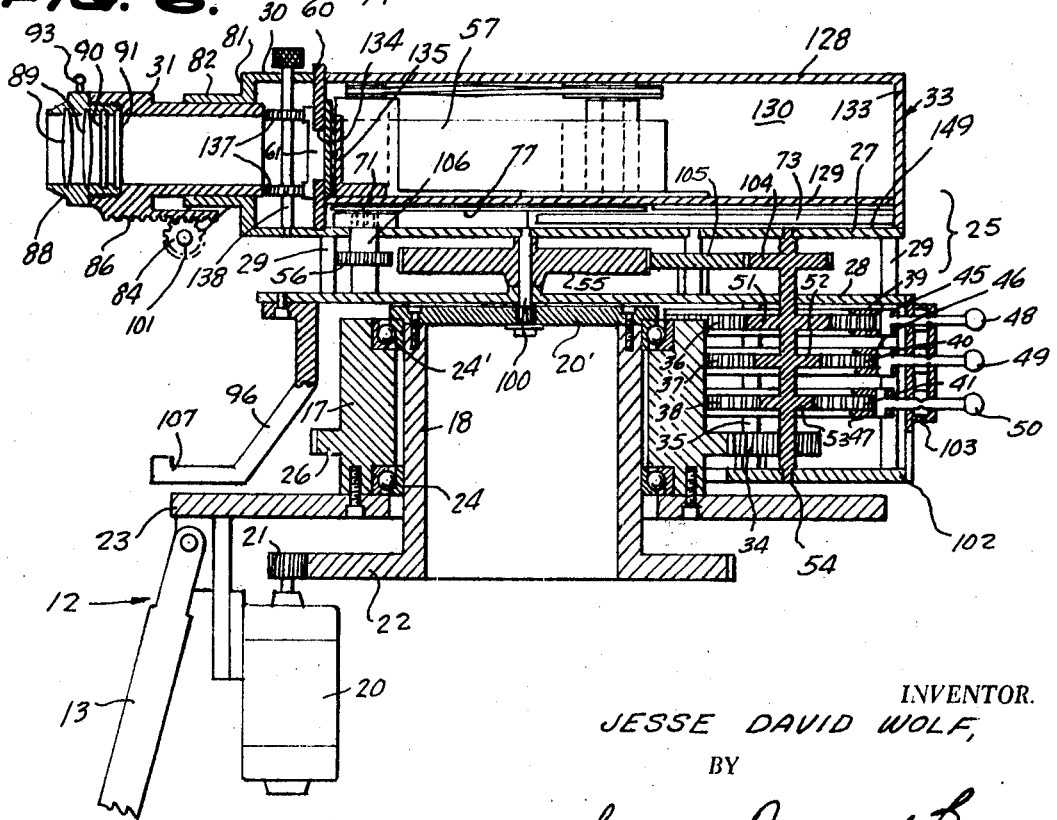
FIG. 6 is a transverse cross-sectional view taken substantially on the line 6—6 of FIG. 1, with the top wall of the film cassette in place.

Referring to the drawings, 11 generally designates an improved rotary panoramic camera assembly constructed in accordance with the present invention. The assembly 11 comprises a suitable support, for example, a tripod of generally conventional construction, designated at 12. The tripod structure 12 includes a plurality of supporting legs 13 pivotally connected at their top ends, as shown at 14, to vertical lug 15 rigidly secured to and depending from the peripheral portion of a flat annular supporting plate 23. As shown in FIGS. 2 and 6, the supporting plate 23 is provided with a transverse depending platelike lug 16 to which is rigidly secured the vertically positioned variable speed drive motor 20 having a driving pinion gear 21 secured on the top end portion of its shaft.

Axially secured to the flat annular plate member 23, concentrically therewith, is the upstanding vertical collar member 17 integrally formed with the outwardly projecting annular readout gear 26. Designated at 18 is a vertical sleeve member journaled inside the collar member 17 coaxially therewith and with the annular member 23, and being integrally formed with the outwardly projecting gear flange 22 at its bottom end, as is clearly shown in FIGS. 2 and 6, the gear element 22 meshing with pinion gear 21. Sleeve 18 is journaled in collar 17 by a pair of ball bearing assemblies 24, 24', as shown in FIG. 6, and the cover disc 20' secured on the top rim of collar member 17, the peripheral portion of said cover disc engaging on and being supported by the inner race element of the top ball bearing assembly 24', as shown in FIG. 6.

Designated generally at 25 is the camera body assembly of the device, said assembly comprising a horizontal upper supporting plate 27 and a horizontal lower supporting plate 28 rigidly secured in parallel relationship and spaced apart by a plurality of vertical connecting posts 29. The structure comprising plate members 27 and 28 and the connecting posts 29 is rigidly secured axially to the top cover member 20' of sleeve 18 by a vertical central shaft member 100 which rigidly unites the camera body 25 with collar member 18 so that said camera body is rotatable on the vertical axis of sleeve member 18 relative to the supporting tripod assembly 12. Thus, the camera body 25 is rotatable relative to the fixed readout gear 26.

A lens frame or supporting housing 30 is rigidly secured on the upper plate member 27 and projects radially outwardly therefrom relative to the vertical axis of rotation defined by the axis of sleeve member 18. A radially extending lens tube 31 is arranged coaxially relative to the supporting housing 20, as shown in FIG. 6. The lens tube 31 is adapted to detachably support a selected lens assembly 88 provided with an optical system comprising lenses 89, 89, an iris 90 and a shutter 91.

Figure 1:
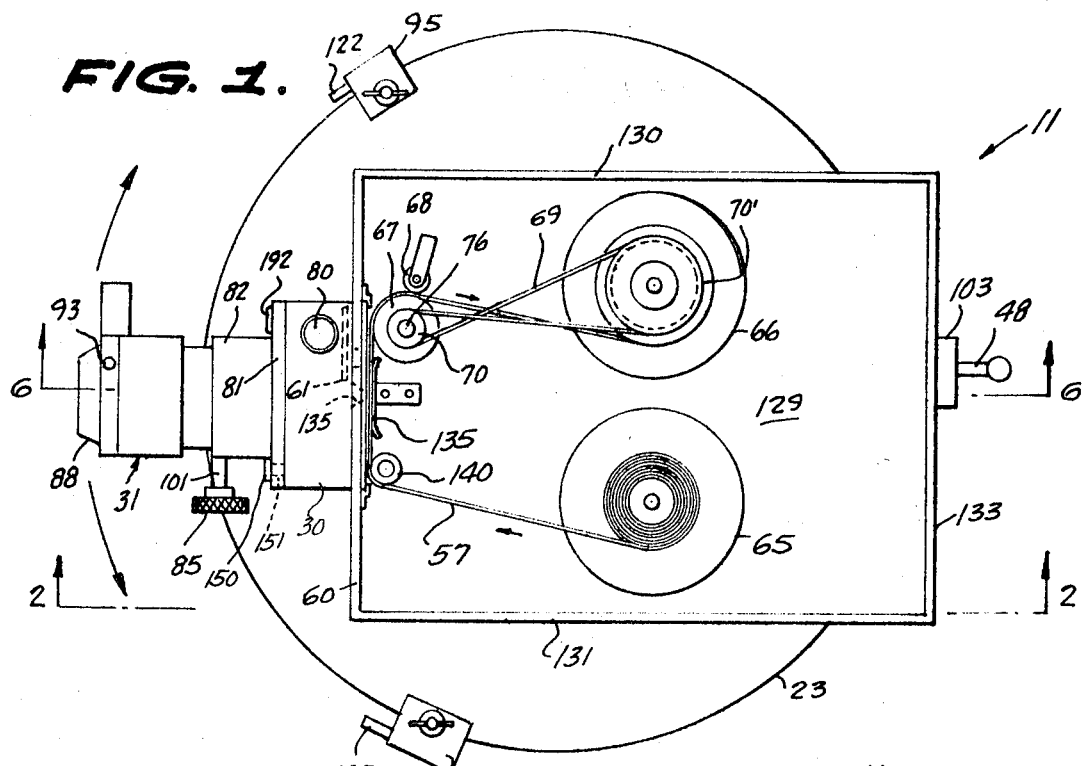
FIG. 1 is a top plan view of an improved rotary panoramic camera assembly according to the present invention, employing a film cassette, shown with the top cover of the film cassette removed.
Figure 4:
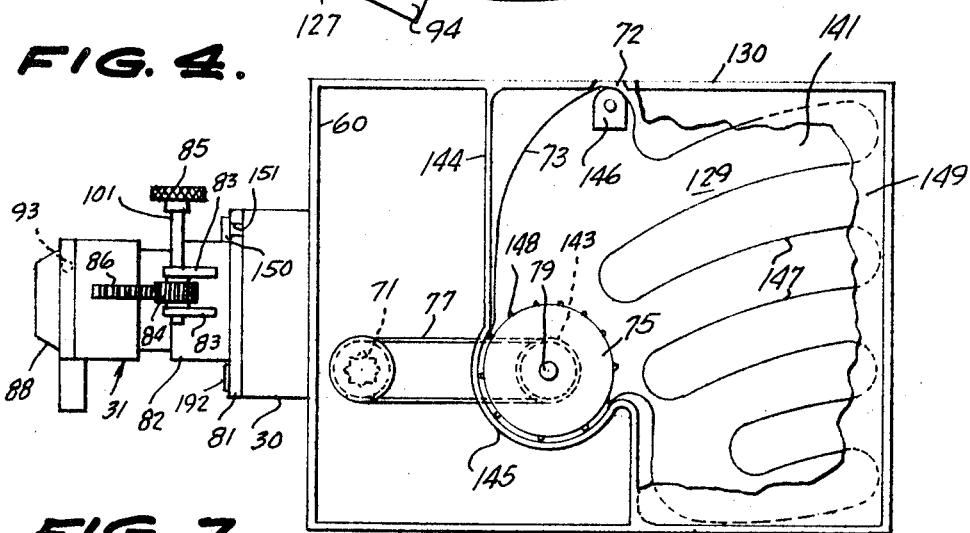
FIG. 4 is a horizontal cross-sectional view taken substantially on the line 4—4 of FIG. 2, with the cassette bottom plate partly broken away.

The structure for telescopically supporting the lens tube 31 includes a detachable mounting sleeve 82 having an attachment flange 81 which is detachably secured in any suitable manner to the front rim of frame 30. For focusing, the tube 31 is provided with a longitudinally extending rack element 86 which is meshingly engaged by a pinion gear 84 mounted on a transverse shaft 101 journaled in depending parallel lugs 83, 83 carried by the tubular member 82, the shaft 101 being provided with an adjusting knob 85, as shown in FIGS. 1 and 4.

The lens assembly is provided with conventional means to control the setting of the iris 90, said means including an electric eye 192 mounted on the quick-detachable supporting plate 81 and with conventional means for opening and closing the shutter 91, said means including a switch 93 provided on the lens mount 88.

A film cassette, shown generally at 33, is adapted to be mounted on the upper horizontal plate 27 and to interlock in a conventional manner with the rear portion of the lens frame 30. A conventional ground glass focusing plate may be a time substitute for the cassette 33 for focusing the lens assembly, in a well-known manner.

Figure 3:
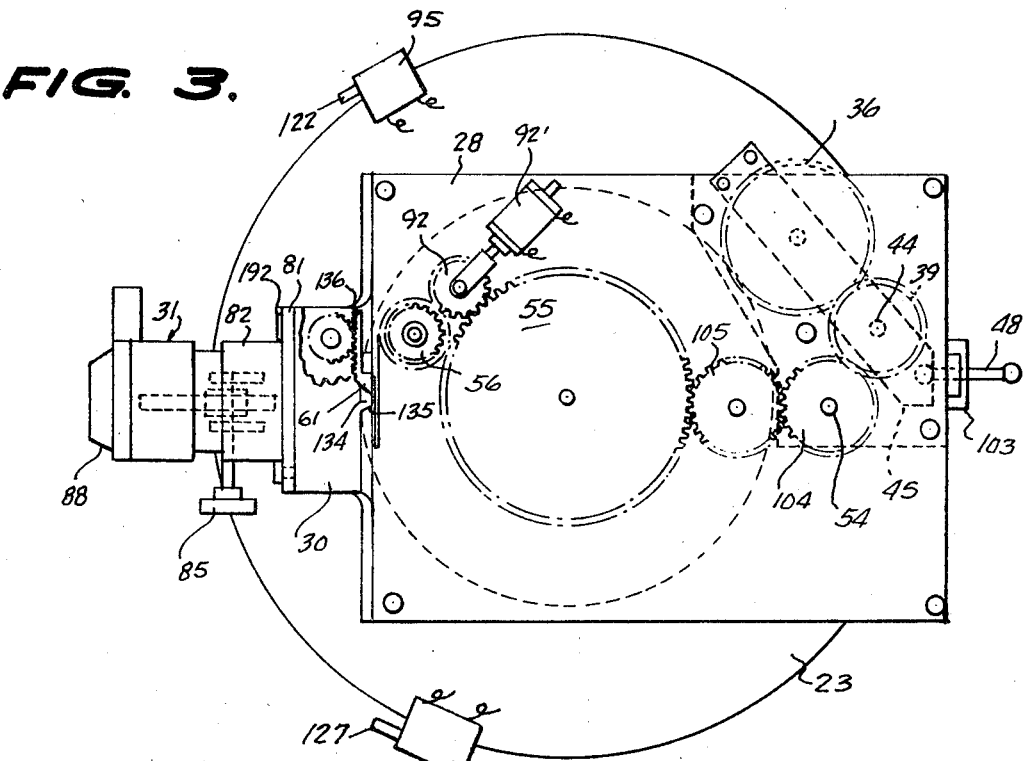
FIG. 3 is a horizontal cross-sectional view taken substantially on the line 3—3 of FIG. 2.

A gear housing 102 is secured beneath the right end portion of horizontal plate member 28, as viewed in FIG. 6, and vertically journaled between the bottom wall of housing 102 and the plate member 28 is a vertical shaft 35. Secured on the lower portion of shaft 35 is the input readout pinion gear 34 which meshes with the large readout gear 26. Shaft 35 carries a plurality of speed gears, for example, three gears shown respectively at 36, 37 and 38. Each gear 36, 37 and 38 is associated with a respective idler gear 39, 40 and 41 journaled in a horizontally swingable gear box 45, 46 and 47. Each of the gear boxes 45, 46 and 47 is pivoted to the input gear shaft 35 to swing horizontally therearound. The respective gear boxes 45, 46 and 47 are provided with respective operating levers 48, 49 and 50 which are pivotally connected to the ends of the gear boxes and which are suitably pivoted in a subhousing 103 provided on the adjacent outer wall of the main gear housing 102. Thus, the inner ends of the levers 48, 49 and 50 are drivingly coupled to the free ends of the gear boxes 45, 46 and 47 for swinging said gear boxes around their common pivotal shaft 35. The respective idler gears 39, 40 and 41 carried by the horizontally swingable gear boxes 45, 46 and 47 are vertically journaled on suitable vertical shafts such as shown at 44 provided in the respective gear boxes. Each speed gear 36, 37 and 38 is in mesh with the respective idler gear 39, 40 and 41. By means of the manually operated control levers 48, 49 and 50, the idler gears 39, 40 and 41 may be selectively meshingly engaged with respective transmission gears 51, 52 and 53 rigidly secured on a vertical shaft 54 journaled between horizontal plate member 27 and the bottom wall of main gear housing 102, as shown in FIG. 6. Rigidly secured on the top end portion of shaft 54 is a gear 104 which meshingly engages an idler gear 105 which in turn is meshingly engaged with a large gear 55 journaled on the shaft 100. The gear 55 may be at times drivingly coupled to the cassette drive gear 56 which is mounted on a vertical shaft 106 journaled vertically in the horizontal plate member 27 and the lower horizontal plate member 28. The gear 56 is coupled to the large gear 55 responsive to the energization of a solenoid 92' suitably mounted on plate member 28 and having a plunger to the outer end of which is journaled a coupling pinion gear 92 which is in mesh with the large gear 55 and which may be extended responsive to energization of the solenoid 92' to meshingly engage the cassette drive gear 56 while remaining in mesh with the large gear 55, as is apparent from FIG. 3. The plunger of the solenoid 92' is provided with conventional spring-operated retraction means whereby the gear 92 is disengaged from the cassette drive gear 56 when the solenoid is deenergized.

Rotation of a selected gear shift lever 48, 49 or 50 to gear-engaging position will provide a specific predetermined selection of speed of rotation of gear 55 and hence of the cassette drive pinion gear 56.

Figure 5:
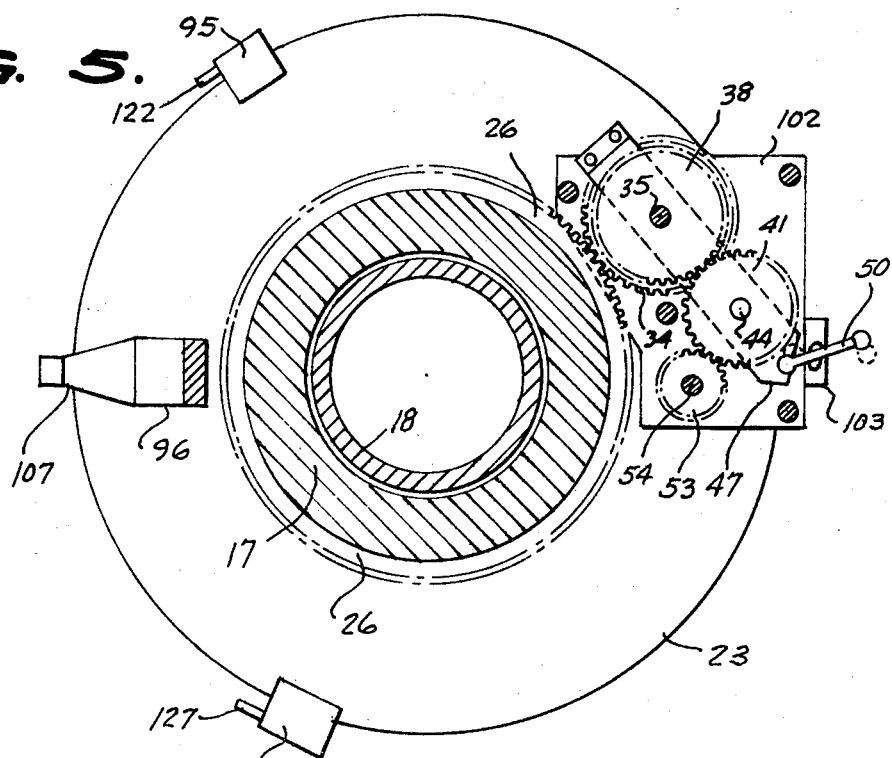
FIG. 5 is a horizontal cross-sectional view taken substantially on the line 5—5 of FIG. 2.

The respective speed-selecting levers 48, 49 and 50 are suitably pivotably mounted for rotation and limited sliding movement in the supporting housing 103, the supporting housing being suitably horizontally slotted to allow the necessary horizontal angular movement of the levers. Thus, the levers are rotatable substantially on a common vertical axis defined by their pivotal connections with the housing 103. Manual rotation of the selected lever, for example, the lever 50 shown in FIG. 5, will provide a specific predetermined selection of speed of the cassette drive gear 56. However, gear 56 will not be driven unless solenoid 92' is energized, since it is necessary for the coupling gear 92 to be simultaneously in mesh with both gear 55 and gear 56 in order for the cassette film transport mechanism to be driven. As will be presently explained, the cassette drive gear 56 is coupled to the large gear 55 by the gear 92 only when the camera scans in its "forward" direction, namely, in a clockwise direction, as viewed in FIG. 1, and the cassette drive gear 56 is uncoupled from gear 55 during the return movement of the camera, namely, the counterclockwise movement thereof as viewed in FIG. 1.

The necessity of providing means to change the speed of the cassette drive gear 56 arises from the fact that different lens assemblies, namely, assemblies having different focal lengths, may be employed with the camera. The speed of travel of the film must be in accordance with the speed of travel of the lens. If, for example, a lens having a focal length of 7 inches is substituted for a lens having a focal length of 6 inches, such lens must be set 1 inch farther from the plane of travel of the film than the 6 inch lens. Hence, the substituted lens travels farther through a given angle, and consequently, the gearing controlling the movement of the film must be changed so that the latter will travel the additional distance in the same time as it is covered by the new lens. Thus, the film must be driven at a faster speed when a substitution of lenses such as just described is made, and accordingly, the appropriate lever 48, 49 or 50 is then operated to provide the changed film driving speed.

Secured to the plate member 28 at its peripheral portion is a depending cam arm 96 which has a forwardly and outwardly projecting lower end portion 107 located so as to be engageable with the operating plungers or respective spaced microswitches 94 and 95 mounted on the stationary base disc 23 at locations spaced apart in accordance with the desired angle of scanning movement of the camera assembly. The motor 20 is of a conventional reversible type having a "forward" and a "reverse" winding, the "forward" winding having the respective terminal conductors 108 and 109 and the "reverse" winding having the respective terminal conductors 110 and 111. The direction of energization of the motor is manually controlled by a double-pole, double-throw switch 112, as illustrated schematically in FIG. 7. Thus, the motor is energized from a pair of line conductors 113 and 114 leading to a suitable supply source, for example, to a source of 110-volt alternating current power. Line conductor 113 is connected to one of the poles 115 of switch 112 and line conductor 114 is connected to the other pole 116 of said switch through a speed-adjusting rheostat 117. The switch 112 has the "forward" stationary contacts 118 and 119, the contact 118 being connected to the conductor 109 and the contact 119 being connected to the conductor 108 through the normally closed microswitch 95. Thus, contact 119 is connected to the pole of microswitch 95 by a conductor 120. Said pole normally engages a stationary contact 121 which is connected to the conductor 108. When switch 112 is manually operated to bring poles 115 and 116 into engagement with the stationary contacts 118 and 119, the "forward" winding of motor 20 is energized through a circuit comprising line conductor 113, pole 115, contact 118, wire 109, the "forward" motor winding, wire 108, contact 121, the pole of microswitch 95 in the position shown in FIG. 7, wire 120, contact 119, pole 116, rheostat 117 and line conductor 114. The motor will remain energized until arm 107 engages the actuating plunger 122 of microswitch 95, which opens the circuit at contact 121 and stops the forward movement of the camera.

Switch 112 has stationary contacts 123 and 124, the conductor 111 being connected to the contact 123 and the conductor 110 being connected to the contact 124 through the stationary contact 125 and the pole of microswitch 94 and a wire 126 connecting said pole to the stationary contact 124 of switch 112. Assuming the camera to be at a position spaced from the microswitch 94, for example, at the extreme clockwise end of its scanning travel wherein the "forward" winding of the motor 20 is deenergized in the manner above described, the motor can be returned to its starting position by operating the switch 112 to move poles 115 and 116, respectively, into engagement with contacts 123 and 124. Thus, when switch 112 is reversed, as just mentioned, the "reverse" winding of motor 20 becomes energized by a circuit comprising line conductor 113, switch pole 115, contact 123, conductor 111, the "reverse" motor winding, wire 110, the stationary contact 125 of microswitch 94, the pole of said microswitch, wire 126, switch contact 124, pole 116, the rheostat 117 and line wire 114. Energization of the motor reverse winding returns the camera assembly to its starting position, the motor becoming deenergized by the engagement of arm 107 with the operating plunger 127 of microswitch 94. The forward scanning action of the camera assembly can then be repeated by moving the switch poles 115 and 116 again into contact with the stationary contacts 118 and 119 of switch 112.

Figure 7:
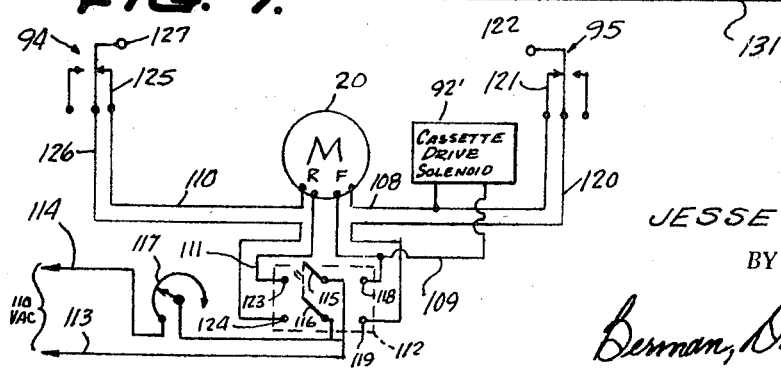
FIG. 7 is a schematic electrical wiring diagram showing the electrical connections of the cooperating electrical elements of the panoramic camera assembly of FIGS. 1 to 6.

The cassette drive solenoid 92' is connected in parallel with the "forward" winding of motor 20, as shown in FIG. 7, so that solenoid 92' becomes energized simultaneously with the energization of said forward winding, whereby transmission gear 92 is moved into intermeshing relationship with the cassette drive gear 56 and transmits driving torque from gear 55 to gear 56 in the manner above described. This provides automatic film advancement during the forward scanning movement of the camera assembly, the speed of the film advancement being selected in accordance with the selection of a lever 48, 49 or 50 in the manner discussed above, namely, in accordance with the specific lens assembly employed.

The microswitches 94 and 95 may be mounted at any desired spacing on the periphery of the circular supporting disc 23, so that any specified portion of the field of view around the axis of rotation of the camera can be photographed repeatedly responsive to manual forward and reverse operation of the double-pole, double-throw switch 112. A forward scan will be provided responsive to each closure of the contacts 115-118 and 116-119 of switch 112, after which the camera can be returned to its starting position by reversing switch 112.

During the reverse movement of the camera the cassette drive solenoid 92' is deenergized so that the film in the cassette does not move during the reverse movement of the camera towards its starting position.

The film cassette assembly 33 comprises a generally rectangular relatively flat container having a removable top wall 128, a bottom wall 129, sidewalls 130 and 131, a transverse front wall 60 and a transverse rear wall 133. As above mentioned, the cassette assembly 33 is removably and interlockingly engageable on the horizontal platelike support member 27, and may be readily removable from the camera body assembly 25, as above mentioned, to permit a conventional ground glass focusing plate to be placed in the focal plane of the camera lens assembly so as to allow the lenses thereof to be properly focused. As will be readily understood, the ground glass focusing plate is placed in the same plane as that of the film to be exposed. Focusing is accomplished by operating the knob 85 in the manner above described.

The front wall 60 of the cassette is provided with a rectangular exposure window 134 located adjacent to a film guide bracket 135 provided in the cassette and secured to the bottom wall 129 parallel to front wall 60 and located to guide a film strip 57 past the exposure window 134. The wall 60 is provided with a vertical adjustable exposure slit assembly have an adjustable gate element movable in the exposure window 134. The adjustable vertical slit assembly comprises a transversely movable gate member 61 which is slidably secured to wall 60 and has a portion engageable in the exposure window 134 and which defines one side edge of an exposure slit, the other slide edge of the exposure slit being defined by the vertical side edge 135 of the film exposure window 134. The gate member 61 is slidably supported in the exposure window 134 for transverse horizontal movement and is provided with top and bottom integral rack bars 136 extending parallel to the top and bottom edges of the exposure aperture 134, said rack bars being meshingly engaging by pinion gears 137, 137 rigidly secured on a vertical shaft 138 journaled in the frame 30. Shaft 138 has an operating knob 80 at its top end which is accessible for rotating said shaft and for thereby adjusting the position of the gate member 61 in the window 134 to provide the desired width of the exposure slit.

As it will be readily understood, the cassette 33 becomes drivingly engaged with suitable coupling means on the shaft of the gear 56 when the cassette is installed on the assembly. Thus, the top end of shaft of the gear 56 may be provided with a pinion gear meshingly engageable in a correspondingly-shaped socket 71 provided at the bottom end of the shaft of the film metering capstan 67, said shaft being shown at 76. The film strip is held against the capstan 67 by a pressure roller 68 of conventional construction, as shown in FIG. 1. Inside the cassette 33 is a film supply spool 65 and a film takeup spool 66, the film engaging around the guide roller 140 on one side of the exposure slit and around the metering capstan 67 at the other side of the slit, the intervening portion of the film being engaged by the resilient guide bracket 135 which acts as a film pressure plate to position the film accurately and firmly behind the variable slit aperture. The metering capstan 67 accurately controls the rate of movement of the film past the exposure slit, said rate being thus maintained in accordance with the speed determined by the selection of lever 48, 49 or 50 for actuation. A flexible belt 69 couples a drive pulley 70 on shaft 76 to a driven pulley 70' on the shaft of takeup spool 66 and provides the takeup tension required to keep the film properly wound on spool 66.

The sidewall 130 of the cassette 33 is provided with a readout window 72 located at the lower portion of the sidewall and opening into a bottom recess 141 defined beneath bottom wall 129. A metering wheel 75 is journaled in the space, being secured on a shaft 79 rotatably mounted in the wall 129. Wheel 75 is driven by a belt 77 which couples the shaft of cassette input gear 71 to a pulley element 143 rigidly secured to wheel 75. The chamber 129 is provided with a transverse partition wall 144 having an arcuately curved portion 145 extending around a portion of the wheel 75 concentrically therewith and defining a guide space for a footage tape 73 which is in the form of an endless loop. The nonslip belt 77 drives the wheel 75 and moves the tape 73 concurrently with the rotation of the film drive capstan 67. The tape passes between the window 72 and abutment member 146 which guides the tape and positions it so that it can be viewed through the window 72. The main portion of the tape is confined in the space provided to the right of the partition wall 144 and assumes a shape having a plurality of folds or loops 147, as shown in FIG. 4. The tape 73 is suitably calibrated to provide an accurate indication of film footage used at any given time.

As shown in FIG. 4, the arcuate wall portion 145 extends closely parallel to the periphery of the wheel 75 and subtends a considerable arc, preferably substantially more than one-half of the circumference of the wheel 75. The tape 73 is frictionally engaged by the wheel and is driven thereby along the arcuate wall portion 145 so as to pull the tape past the window 72 synchronously with the movement of the film strip 57. The periphery of the wheel 75 may be suitably provided with friction means, such as rubber projections 148, to provide the necessary frictional driving engagement of the footage indicating strip 73.

The cassette may be provided with a bottom retaining plate or cover 149 extending transversely and horizontally across the bottom right hand portion of the space 141, as viewed in FIGS. 2 and 6, to support the loops 147 and to aid to retaining the tape 73 in the compartment provided therefor. The footage indicating tape 73 may be employed to provide an accurate indication of the film footage used up at any given time, without regard to changing of cassettes, or the like, or alternatively, may be employed to indicate the amount of film footage exposed in a given cassette.

As above mentioned, the lens assembly 31 is provided with quick-disconnect mount means 81 so that the assembly including the tube 82 may be quickly dismounted from the frame 30 and replaced by another assembly including a lens system of different focal length, as above described. Under these conditions, the film speed is changed by operating the appropriate lever 48, 49 or 50 to provide the proper speed of film movement corresponding to the newly installed lens system.

The quick-disconnect coupling means between the flange 81 and the frame 30 are conventional per se and may comprise a plurality of headed pins 150 projecting from the rim of the frame member 30 and lockingly engaged by correspondingly located slots 151 formed in the member 81 and being lockingly engageable with the headed pins 150.

The cassette 33 may be similarly arranged to interlock with the supporting plate 27 with the film exposure aperture 61 in alignment with and located substantially in the focal plane of the lens assembly. In this position, the drive pinion at the top end of the film driving shaft 106 will be in meshing engagement in the drive socket 71, as above described. Thus, when said drive pinion is meshed in the socket 71, the cassette will be automatically correctly positioned on the supporting plate 37 and the front wall 60 of the cassette will be held against the frame member 30 with the rack bars 136, 136 carried by the gate member 61 of the cassette meshing with the pinion gears 137, 137 mounted on the shaft 138 carried by the frame member 30. In this position, the adjustable exposure aperture 61 is located in proper registry with the optical axis of the lens assembly.

In operation, with the parts associated with the lens assembly 31 properly set and with the exposure slit properly adjusted in accordance with the prevailing conditions, and with a loaded cassette 33 installed on the camera, exposure of the film will commence by energizing the "forward" winding of motor 20 with the camera assembly in its starting position, namely, with the arm 107 in engagement with the operating plunger 127 and microswitch 94. Scanning exposure of the film is then initiated by operating the switch 112 so as to engage poles 116 and 115, respectively, with contacts 119 and 118, as above described, which energizes the drive solenoid 92' simultaneously with the "forward" winding of motor 20. The camera assembly then begins to rotate in a clockwise direction, as viewed in FIG. 1, from microswitch 94 toward microswitch 95, and simultaneously, the film is moved past the exposure slit and is wound up on the reel 66 at a rate in accordance with the selected lens, as determined by the actuation of the associated control lever 48, 49 or 50. As above explained, the focal length of the lens employed will dictate the choice of which of the speed-controlling levers 48, 49 or 50 is to be actuated. Thus, as the camera swings through its intended arc of travel, each part of the scene on which it is focused is progressively photographed on the film strip, the speed of movement of the film strip being at the proper ratio to the speed of angular movement of the camera assembly so as to provide continuous photography of the scene. This photography terminates when the arm 107 engages the operating plunger 122 of the opposite limiting microswitch 95, whereby motor 20 and solenoid 92' becomes deenergized. The camera assembly may be returned to its starting position adjacent the microswitch 94, as above described, by reversing the switch 112.

Any desired number of views of the scene under surveillance can be obtained by successively repeating the above-described operation, namely, by successively operating switch 112 first to "forward" position wherein poles 116 and 115 engage contacts 112 and 118, and then to "reverse" position wherein poles 116 and 115, respectively, engage contacts 124 and 123. This may be done manually or, if so desired, may be done in a timed or programmed manner by employing a conventional motor-driven reversing switch assembly, for example, of the commutator type, in place of the manually operated reversing switch 112. The motor-driven reversing switch may be suitably timed or programmed to provide repeated photographing scans at predetermined intervals.

After a roll of film has been completely exposed and has been wound up on the takeup reel 66, the original cassette may be removed and replaced by a fresh cassette containing a new roll of unexposed film.

The exposed film may be removed from a cassette in a dark room for processing, and new film may be similarly inserted in a cassette in the dark room. As above explained, the cassette has a removable top cover 128 which can be readily detached in the dark room to provide access to the interior of the cassette.

While a specific embodiment of an improved panoramic camera assembly has been disclosed in the foregoing description, it will be understood that various modifications within the spirit of the invention may occur to those skilled in the art. Therefore, it is intended that no limitations be placed on the invention except as defined by the scope of the appended claims.

I claim:

1. In a panoramic camera, a support, a camera rotatably mounted on said support for rotation of the optical axis thereof substantially in a horizontal plane, said camera including a changeable lens system and film transport means for moving a film relative to said lens system, motor means on the support, first transmission means drivingly coupling said motor means to the camera, and second transmission means drivingly coupling said first transmission means to the film transport means, wherein said second transmission means comprises changeable gearing and gear-shift means to selectively adjust the drive ratio of said changeable gearing for adjusting the relative speed of movement of the film with respect to the speed of rotation of the camera.

2. The panoramic camera of claim 1, wherein said changeable gearing includes a plurality of idler transmission gears movably mounted on the camera, and said gear-shift means comprises means to selectively move the idler gears into drive-transmitting relationship between the first transmission means and the film transport means.

3. The panoramic camera of the claim 2, and wherein the idler gears are provided with respective supporting frames pivoted to the camera, and wherein the means to move the idler gears comprises means to selectively rotate said supporting frames.

4. The panoramic camera of claim 3, and wherein said supporting frames are pivoted on a common vertical axis, and wherein said means to rotate the supporting frames comprises respective levers pivoted to the camera and drivingly connected to the supporting frames.

5. The panoramic camera of claim 4, and wherein said changeable gearing comprises a gear train including a vertical shaft journaled on the camera and carrying a plurality of vertically spaced gears of different size, said vertical shaft being drivingly coupled to said first transmission means in a fixed speed ratio relative thereto, said supporting frames being respectively mounted at the same levels as said last-named gears, whereby said idler gears can be selectively meshingly engaged with said different-sized last-named gears.

6. The panoramic camera of claim 1, and wherein said second transmission means includes electromagnetic clutch means.

7. The panoramic camera of claim 6, and means to actuate said electromagnetic clutch means to establish a driving connection between the first and second transmission means when the camera is driven in one direction, and means to render the clutch means inoperative when the camera is driven in the opposite direction.

8. The panoramic camera of claim 1, and wherein said second transmission means includes a gear train having a movably mounted coupling gear retractable to noncoupling position, and electromagnetic means to move said coupling gear into coupling position.

9. The panoramic camera of claim 8, and means to actuate said electromagnetic means simultaneously with the operation of said motor means.

10. The panoramic camera of claim 8, and wherein said electromagnetic means comprises a solenoid mounted on the camera and having a plunger, said coupling gear being journaled to the plunger and being in noncoupling position when the solenoid is deenergized, said coupling gear being movable into coupling position responsive to the energization of said solenoid.

11. The panoramic camera of claim 10, and wherein said motor means comprises a reversible electric motor having respective forward and reverse windings, means to selectively energize said windings, and means to energize said solenoid simultaneously with the energization of said forward winding.

12. The panoramic camera of claim 11, and means to deenergize said windings responsive to the rotation of the camera to respective forward and reverse limiting positions on said support.

13. The panoramic camera of claim 12, and wherein said second transmission means comprises changeable ratio gearing, and means mounted on the camera to selectively adjust the drive ratio of said gearing.

14. The panoramic camera of claim 13, and wherein said changeable ratio includes a plurality of idler transmission gears, respective supporting frames pivoted to the camera and carrying said idler gears, and means to selectively rotate said supporting frames to move said idler gears into coupling positions.

15. The panoramic camera of claim 14, and wherein the camera includes a removable cassette containing said film transport means, said cassette having a film exposure aperture and having means to couple the film transport means to the second transmission means when the cassette film exposure aperture is aligned with the optical axis of the lens system.

16. The panoramic camera of claim 15, and wherein said cassette is provided with an adjustable gate member cooperating with said aperture to determine the width of said aperture.

17. The panoramic camera of claim 16, and width-adjusting means on the lens system operatively engageable with said gate member when the cassette is in a position to couple the film transport means to the second transmission means.

* * * * *